(12) United States Patent
Suwabe

(10) Patent No.: US 8,976,381 B2
(45) Date of Patent: Mar. 10, 2015

(54) PRINTING APPARATUS, METHOD FOR CONTROLLING PRINTING APPARATUS, AND STORAGE MEDIUM

(71) Applicant: Canon Kabushiki Kaisha, Tokyo (JP)

(72) Inventor: Takeshi Suwabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/097,744

(22) Filed: Dec. 5, 2013

(65) Prior Publication Data

US 2014/0160508 A1 Jun. 12, 2014

(30) Foreign Application Priority Data

Dec. 7, 2012 (JP) ................. 2012-268531

(51) Int. Cl.
*G06F 15/00* (2006.01)
*G03G 15/00* (2006.01)
*G06F 3/12* (2006.01)
(52) U.S. Cl.
CPC ................ *G03G 15/50* (2013.01); *G06F 3/121* (2013.01); *G06F 3/123* (2013.01)
USPC ........................................................ 358/1.13

(58) Field of Classification Search
USPC ....................................................... 358/1.13
See application file for complete search history.

(56) References Cited

U.S. PATENT DOCUMENTS

2005/0158100 A1* 7/2005 Yamaguchi et al. ............ 400/62

FOREIGN PATENT DOCUMENTS

JP 2001-142592 A 5/2001

* cited by examiner

*Primary Examiner* — Saeid Ebrahimi Dehkordy
(74) *Attorney, Agent, or Firm* — Canon U.S.A., Inc. IP Division

(57) ABSTRACT

A printing apparatus determines whether software to be updated is software related to a GUI display function. If the software to be updated is determined to be software related to the GUI display function, the printing apparatus performs control to display information about a status of the own apparatus during execution of the update by using a CUI display function.

7 Claims, 16 Drawing Sheets

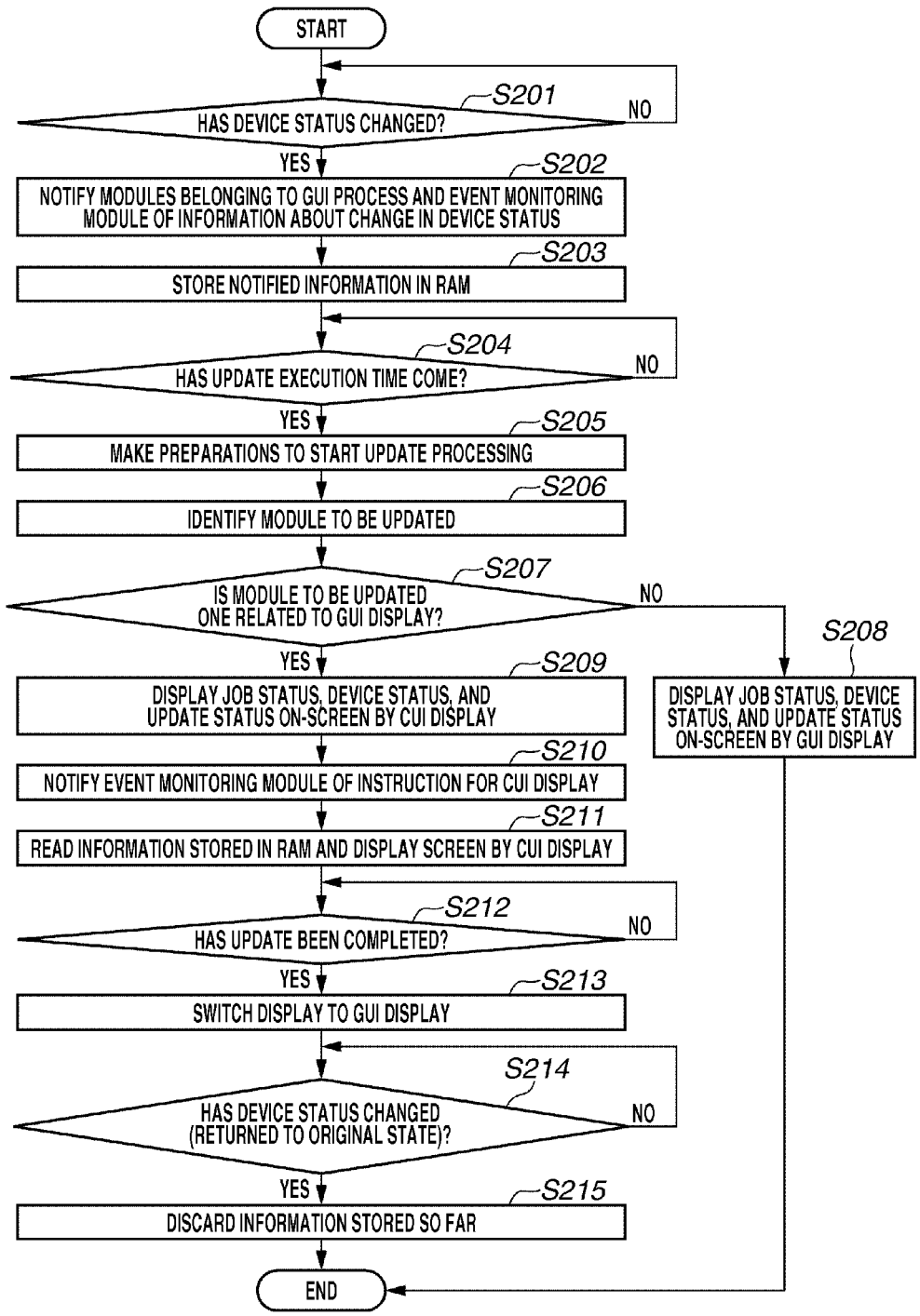

FIG.13

| FUNCTION | MODULE |
|---|---|
| GUI DISPLAY (1003) | FB WRITING MODULE |
| | FB WRITING MODULE-DRAWING FRAMEWORK COMMUNICATION MODULE |
| | GUI DRAWING FRAMEWORK |
| | WINDOW MANAGER |
| CUI DISPLAY (1004) | FB WRITING MODULE |
| | FB CHARACTER WRITING MODULE |
| | UPDATE MODULE |
| COPY FUNCTION (1005) | COPY APPLICATION |
| | JOB CONTROL MODULE |
| | SCANNER HANDLING MODULE |
| | PRINTER HANDLING MODULE |
| | IMAGE PROCESSING MODULE |
| PRINT FUNCTION (1006) | NETWORK APPLICATION |
| | JOB CONTROL MODULE |
| | PRINTER HANDLING MODULE |
| | IMAGE PROCESSING MODULE |

FIG.14A

1011 — DEPENDENCY A
　1. 402 FB WRITING MODULE
　2. 403 FB WRITING MODULE-DRAWING FRAMEWORK COMMUNICATION MODULE
　3. 404 GUI DRAWING FRAMEWORK
　4. 405 WINDOW MANAGER
　5. 406 VARIOUS APPLICATIONS

1012 — DEPENDENCY B
　1. 412 FB WRITING MODULE
　2. 413 FB CHARACTER WRITING MODULE
　3. 414 UPDATE MODULE

FIG.14B

1013 — EXCLUSIVE RELATIONSHIP
　1. DEPENDENCY A, DEPENDENCY B

PRINTING APPARATUS, METHOD FOR CONTROLLING PRINTING APPARATUS, AND STORAGE MEDIUM

BACKGROUND OF THE INVENTION

1. Field of the Invention

The present invention relates to a printing apparatus, a method for controlling the printing apparatus, and a storage medium.

2. Description of the Related Art

Firmware and other such software (hereinafter, referred to simply as software) of a business machine (hereinafter, referred to as multifunction peripheral (MFP)) such as a copying machine are usually updated with functions provided by the MFP stopped. MFPs, particularly high-end ones, are typically used to continuously perform printing, and it is extremely important to reduce downtime. Factors causing downtime include a paper jam and a paper out. According to the software updating method of the existing MFPs, the very functions need to be stopped and made unavailable to users. Software update can thus be a factor in causing downtime. Even with middle-range and low-end MFPs, downtime can cause interference with business operations, for example, when using a facsimile (FAX). Downtime resulting from software update is thus desired to be reduced.

Update processing of an MFP may be regarded as a function (job), in which case the MFP can handle the update processing in the same way as, for example, a copy function.

Japanese Patent Application Laid-Open No. 2001-142592 discusses a technique for providing a status display area as a dedicated area under a main display area of an operation screen, and displaying a status of a preceding job in process. The technique discussed in Japanese Patent Application Laid-Open No. 2001-142592 can display an update status in the status display area while using a copy function.

According to the technique discussed in Japanese Patent Application Laid-Open No. 2001-142592, a job status or a device status cannot be displayed while software related to the display function is being updated. For example, suppose that a paper jam occurs during printing while update is in progress. If the device status cannot be displayed, the user may fail to notice the paper jam and the printing may be suspended to cause downtime.

SUMMARY OF THE INVENTION

According to an aspect of the present invention, a printing apparatus having a first display function and a second display function includes a printing unit configured to execute print processing based on a print job, an updating unit configured to execute update processing for updating software of the printing apparatus, a display unit configured to display a screen indicating an execution status of the print processing and an execution status of the update processing, a determination unit configured to determine, when the updating unit executes the update processing, whether the software to be updated by the update processing is software related to the first display function, and a display control unit configured to control, if the determination unit determines that the software to be updated is not software related to the first display function, the display unit to display the screen indicating the execution status of the print processing and the execution status of the update processing by using the first display function, and to control, if the determination unit determines that the software to be updated is software related to the first display function, control the display unit to display the screen indicating the execution status of the print processing and the execution status of the update processing by using the second display function.

Further features of the present invention will become apparent from the following description of exemplary embodiments with reference to the attached drawings.

BRIEF DESCRIPTION OF THE DRAWINGS

FIG. 12 is a flowchart illustrating an example of processing according to a second exemplary embodiment.

FIG. 13 is a diagram illustrating an example of correspondence between functions and modules.

FIG. 14A is a diagram illustrating an example of dependency between modules.

FIG. 14B is a diagram illustrating an example of an exclusive relationship between dependency groups.

DESCRIPTION OF THE EMBODIMENTS

Various exemplary embodiments, features, and aspects of the invention will be described in detail below with reference to the drawings.

A first exemplary embodiment deals with an example of a case where a device status changes while a software module (hereinafter, referred to simply as module) including firmware related to GUI display is being updated. Display provided by a GUI display function is an example of display by a first display function.

Figure 1:
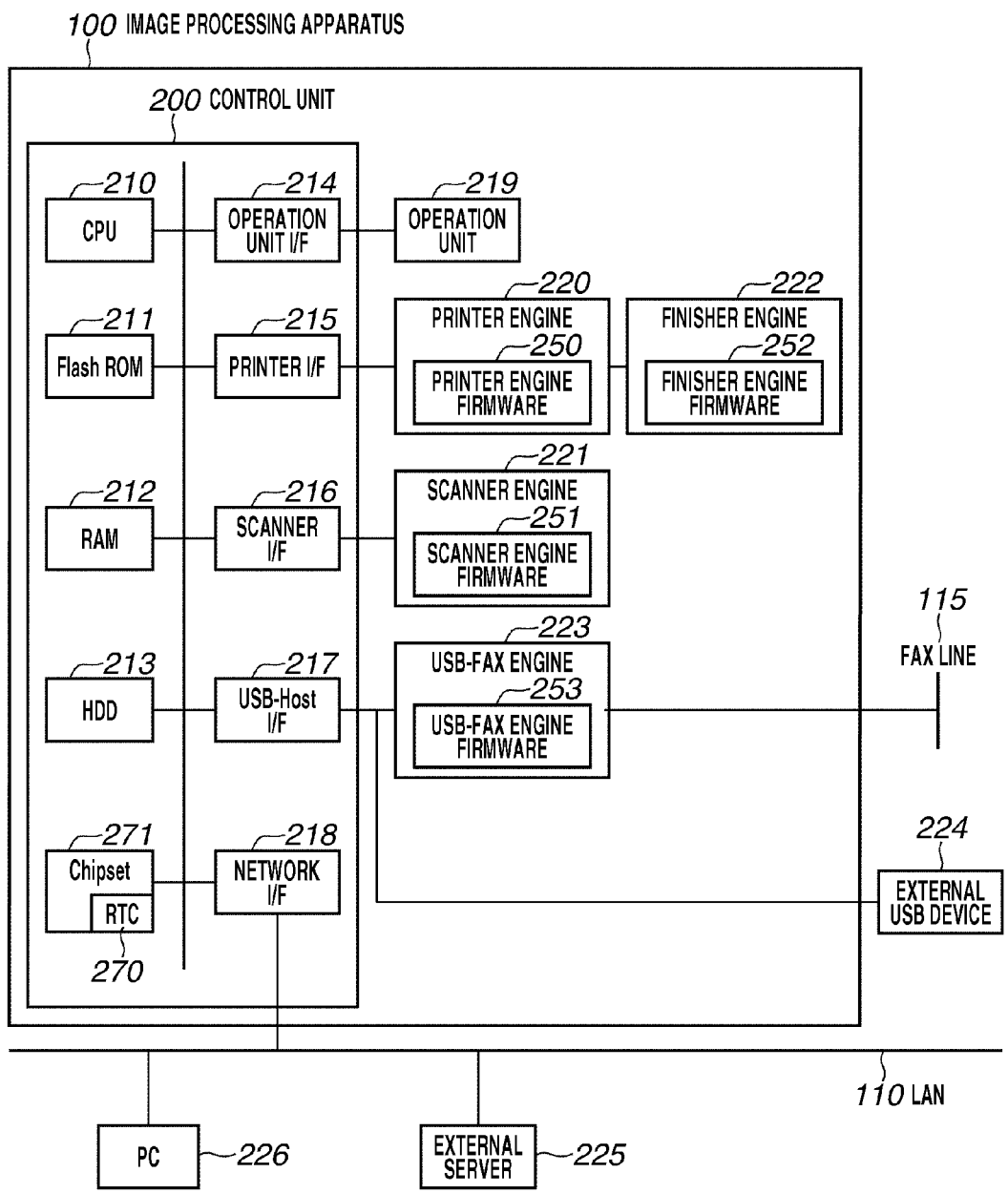
FIG. 1 is a diagram illustrating an example of a system configuration and a hardware configuration of an image processing apparatus.

FIG. 1 is a diagram illustrating an example of a system configuration and a hardware configuration of an image processing apparatus (printing apparatus) 100. Processing performed by the image processing apparatus 100 is an example of information processing.

A control unit 200 including a central processing unit (CPU) 210 controls operations of the entire image processing apparatus 100.

The CPU 210 reads control programs stored in a flash ROM 211 to perform various types of control processing including read control, print control, and firmware update control. The CPU 210 executes programs stored in the flash ROM 211 to implement functions (software configuration) of the image processing apparatus 100 and processing according to flowcharts to be described below.

The flash ROM 211 is used as a storage area of the control programs and firmware update files, a work area, and a user data area.

A random access memory (RAM) 212 is used as temporary storage areas such as a main memory and a work area for the CPU 210. The RAM 212 is also used as a storage area of a frame buffer (video RAM (VRAM)) intended for display of an operation unit 219.

A hard disk drive (HDD) 213 stores image data and user data. Note that the image processing apparatus 100 sometimes does not include the HDD 213. In such a case, image data and user data may be stored in the flash ROM 211 or the RAM 212. The flash ROM 211, the RAM 212, and the HDD 213 are examples of a storage unit.

An operation unit interface (I/F) 214 connects the operation unit 219 with the control unit 200.

The operation unit 219 includes a keyboard and a liquid crystal display unit having a touch panel function. A printer I/F 215 connects a printer engine 220 with the control unit 200.

The printer engine 220 includes a ROM which stores printer engine firmware 250. Image data to be printed by the printer engine 220 is transferred from the control unit 200 to the printer engine 220 via the printer I/F 215, and printed on a recording medium by the printer engine 220. The printer engine 220 may be connected to a finisher engine 222.

The finisher engine 222 includes a ROM which stores finisher engine firmware 252. The finisher engine 222 has a function of sorting and stapling printed recording media delivered from the printer engine 220.

A scanner I/F 216 connects a scanner engine 221 with the control unit 200.

The scanner engine 221 includes a ROM which stores scanner engine firmware 251. The scanner engine firmware 251 may be stored in the flash ROM 211. The scanner engine 221 reads an image on a document to generate image data, and inputs the image data into the control unit 200 via the scanner I/F 216.

A Universal Serial Bus (USB)-host I/F 217 connects a USB-FAX engine 223 with the control unit 200.

The USB-FAX engine 223 includes a ROM which stores USB-FAX engine firmware 253. The USB-FAX engine 223 has a function of faxing image data read by the scanner engine 221 over a FAX line 115. The USB-host I/F 217 can also be connected to an external USB device 224. Examples of the external USB device 224 include a USB memory and a USB keyboard. A user may store update firmware in a USB memory, and the image processing apparatus 100 may download and store the update firmware into a file storage area of the flash ROM 211.

A network I/F 218 connects the control unit 200 with a local area network (LAN) 110. The network I/F 218 transmits image data or information to external devices (such as an external server 225 and a personal computer (PC) 226) on the LAN 110, and receives update firmware or various types of information. The external server 225 may be located on the Internet.

A real-time clock (RTC) 270 of a chipset 271 notifies a time.

Figure 2:
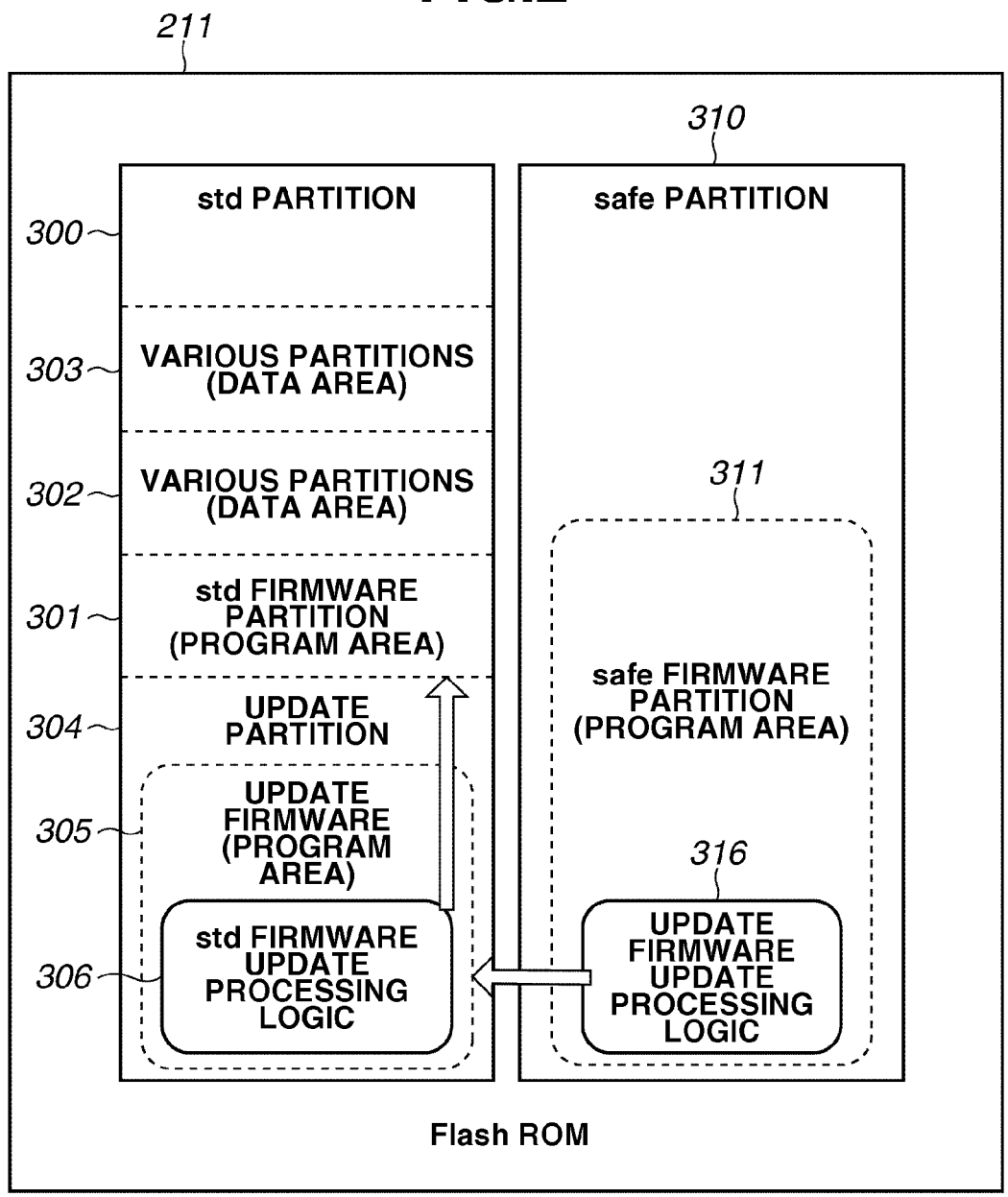
FIG. 2 is a diagram illustrating an example of a configuration of a flash read-only memory (ROM).

FIG. 2 is a diagram illustrating an example of a configuration of the flash ROM 211.

The flash ROM 211 is divided into two partitions, e.g., a std partition 300 and a safe partition 310. The std partition 300 is further divided into a std firmware partition 301, various partitions 302 and 303, and an update partition 304.

The std firmware partition 301 is a program area for performing copy jobs and print jobs.

The various partitions 302 and 303 are data areas serving as work areas to be used when programs run and storage locations of user data.

The update partition 304 is an area that stores update firmware 305 for updating the std firmware partition 301.

The update firmware 305 includes std firmware update processing logic 306. The update firmware 305 can update the std partition 300 even when a copy job or print job is in process.

The safe partition 310 includes a safe firmware partition 311 as a program area. The safe firmware partition 311 has a function of updating the update firmware 305 in the std partition 300. The safe firmware partition 311 updates the update firmware 305 according to update firmware update processing logic 316.

Figure 3:
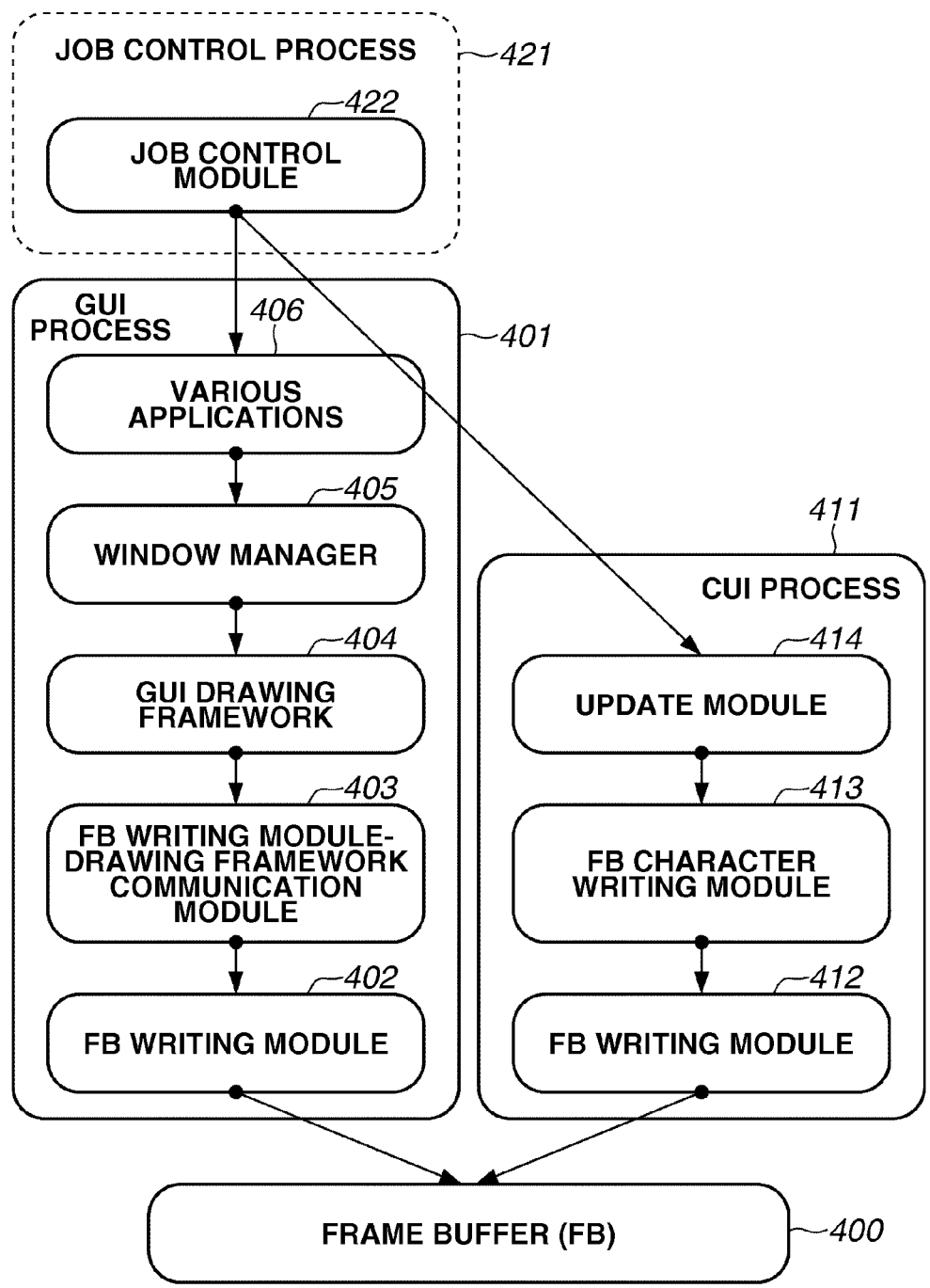
FIG. 3 is a diagram illustrating an example of a configuration of software modules for graphical user interface (GUI) display and character user interface (CUI) display.

FIG. 3 is a diagram illustrating an example of a configuration of modules for GUI display and CUI display. Display provided by a CUI display function is an example of display by a second display function.

A frame buffer (FB) 400 uses an area of the RAM 212. The CPU 210 flashes data drawn in the FB 400 (outputs the buffer contents) to display the data on the operation unit 219.

A GUI display system includes the following modules included in a GUI process 401. The GUI process 401 includes an FB writing module 402, an FB writing module-drawing framework communication module 403, a GUI drawing framework 404, a window manager 405, and various applications 406.

The FB writing module 402 has a function of writing drawing data to the FB 400.

The FB writing module-drawing framework communication module 403 serves as a bridge between the GUI drawing framework 404 and the FB writing module 402. The GUI drawing framework 404 is provided when the various applications 406 draw an image on the operation unit 219.

Examples of the various applications 406 include a copy application and a print application.

The window manager 405 controls which application is displayed on the operation unit 219. In other words, the various applications 406 are controlled by the window manager 405 when drawing an image on the GUI drawing framework 404.

A CUI display system includes the following modules included in a CUI process 411. The CUI process 411 includes an FB writing module 412, an FB character writing module 413, and an update module 414.

The FB writing module 412 is a module that directly writes characters to the FB 400.

The FB character writing module 413 receives a write instruction from the update module 414.

A job control process 421 includes a job control module 422.

The job control module 422 controls various jobs. The job control module 422 has a function of notifying information to the GUI process 401 and the CUI process 411 to display a job status and a device status by GUI/CUI display.

Figure 4:
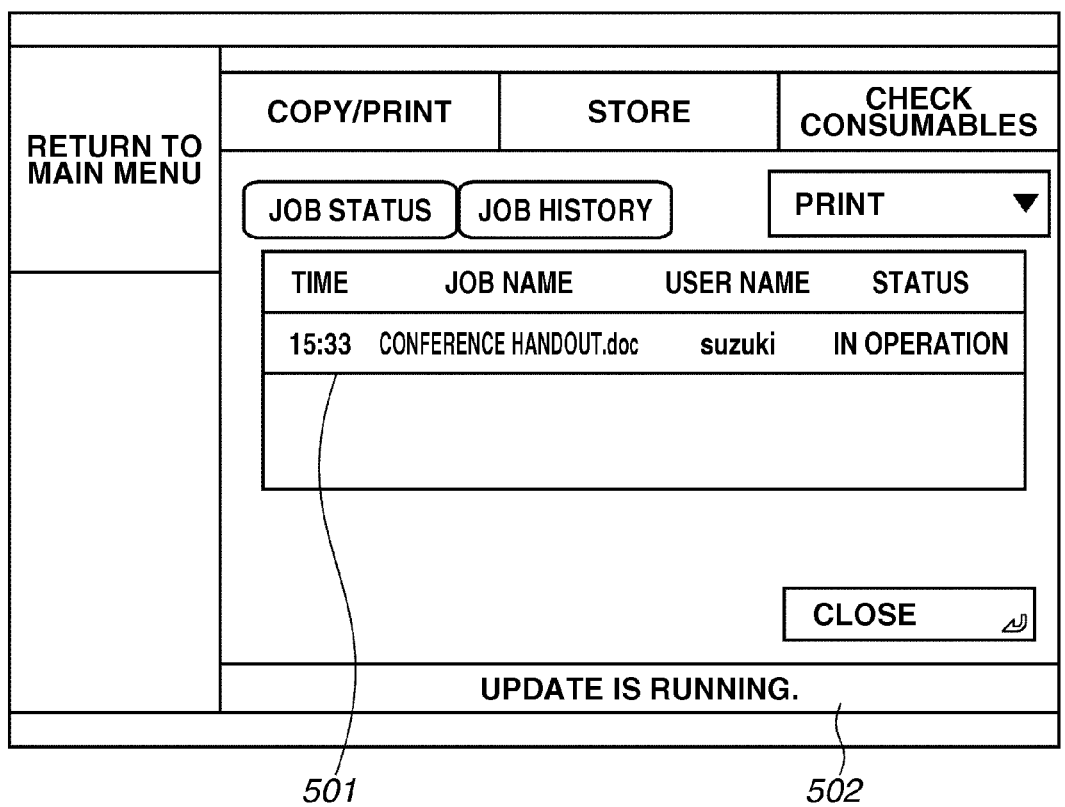
FIG. 4 is a diagram illustrating an example of a screen display by GUI display.

FIG. 4 is a diagram illustrating an example of a screen display by GUI display. More specifically, FIG. 4 is a diagram illustrating an example of an image that the FB writing module 402 writes to the FB 400.

The example of FIG. 4 illustrates a screen displaying a job status and an update status. Device statuses such as the job status and the update status are an example of apparatus information about apparatus statuses of the own apparatus.

A display 501 indicates that the image processing apparatus 100 is printing a file named "CONFERENCE HANDOUT.doc" at 15:33.

A display 502 indicates that update processing is in progress.

Figure 5:
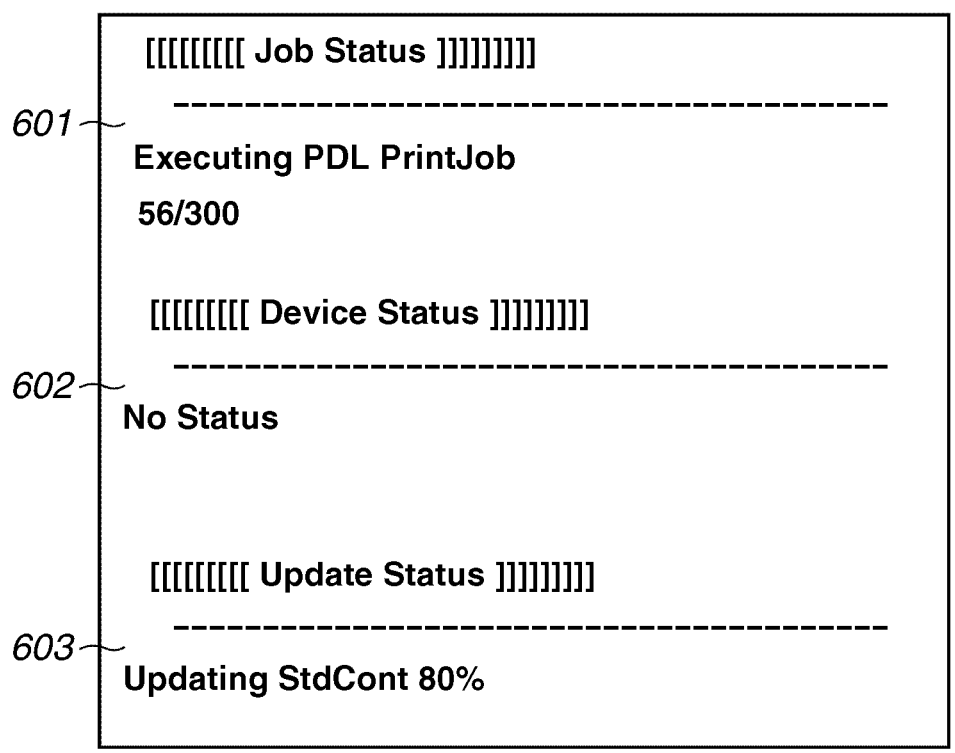
FIG. 5 is a diagram illustrating an example of a screen display by CUI display.

FIG. 5 is a diagram illustrating an example of a screen display by CUI display. More specifically, FIG. 5 is a diagram illustrating an example of an image that the FB writing module 412 writes to the FB 400.

The example of FIG. 5 illustrates a screen displaying a job status and an update status.

A display 601 displays a job status, more specifically, displays that a print job is running.

A display 602 displays a device status, more specifically, displays that there is no particular information at present.

A display 603 displays an update status, more specifically, displays that the std firmware partition 301 is being updated.

Figure 6:
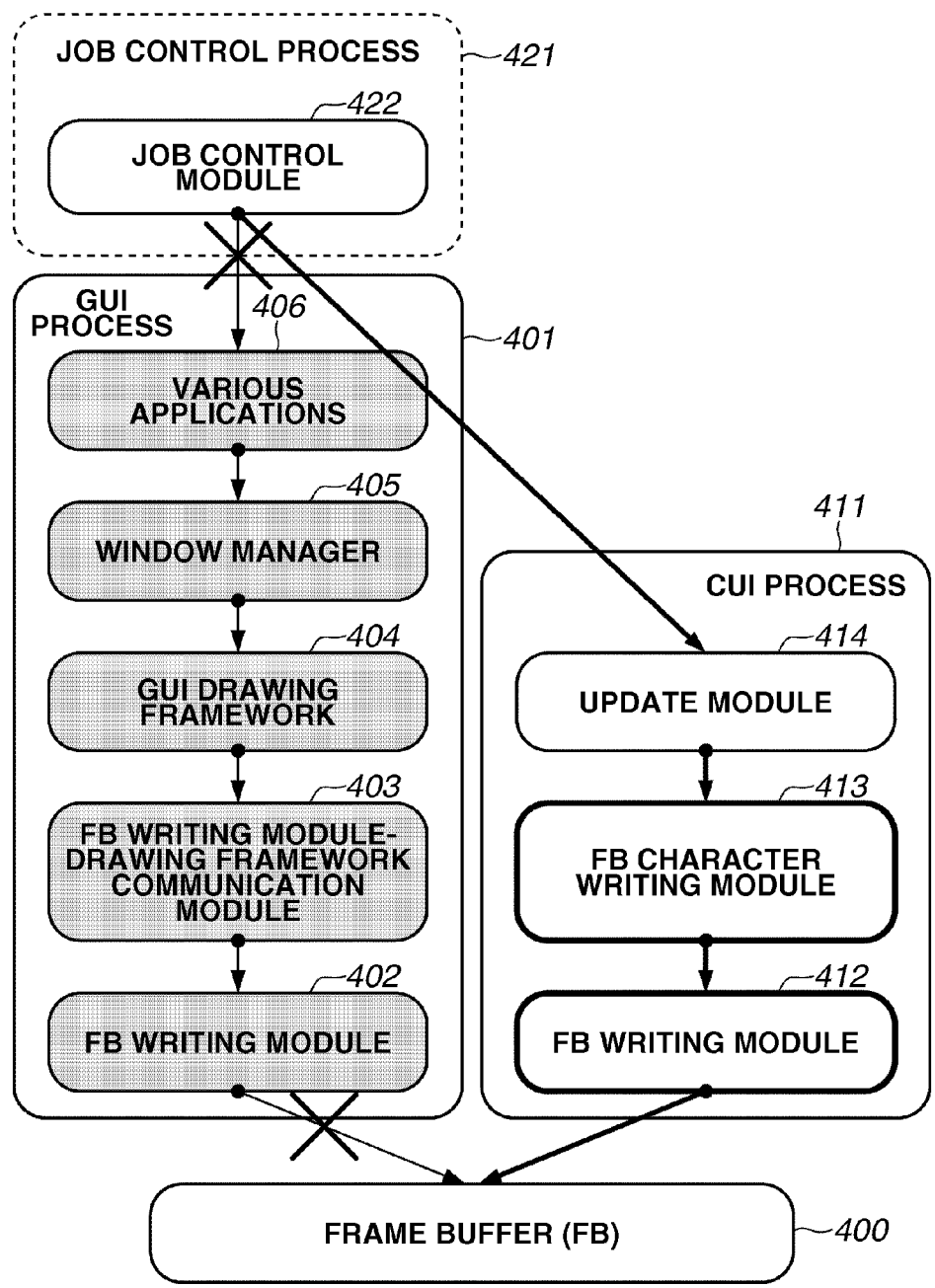
FIG. 6 is a diagram illustrating an example of information transmission paths when a job status or a device status changes during update of a module related to GUI display.

FIG. 6 is a diagram illustrating an example of information transmission paths when a job status or a device status changes during update of a module related to GUI display.

If the job control module 422 detects a change in a job status or a device status, the job control module 422 usually transmits the detected information to the modules belonging to the GUI process 401 to display a screen by GUI display. However, if a module belonging to the GUI process 401 is being updated, the GUI display function is not available. The job control module 422 then transmits the information to the modules belonging to the CUI process 411. The information is thus transmitted from the job control module 422 to the update module 414, the FB character writing module 413, the FB writing module 412, and the FB 400. As a result, the image processing apparatus 100 displays a screen by CUI display such as the one illustrated in FIG. 5 or FIG. 8.

Now, referring to FIGS. 7 and 8, display when a paper jam occurs during update will be described for a case where the module to be updated is one related to GUI display and for a case where the module to be updated is one not related to GUI display. Note that a paper jam is an example of troubles the image processing apparatus 100 may face. Information about troubles such as the occurrence of a paper jam is an example of trouble information of the image processing apparatus 100.

Figure 7:
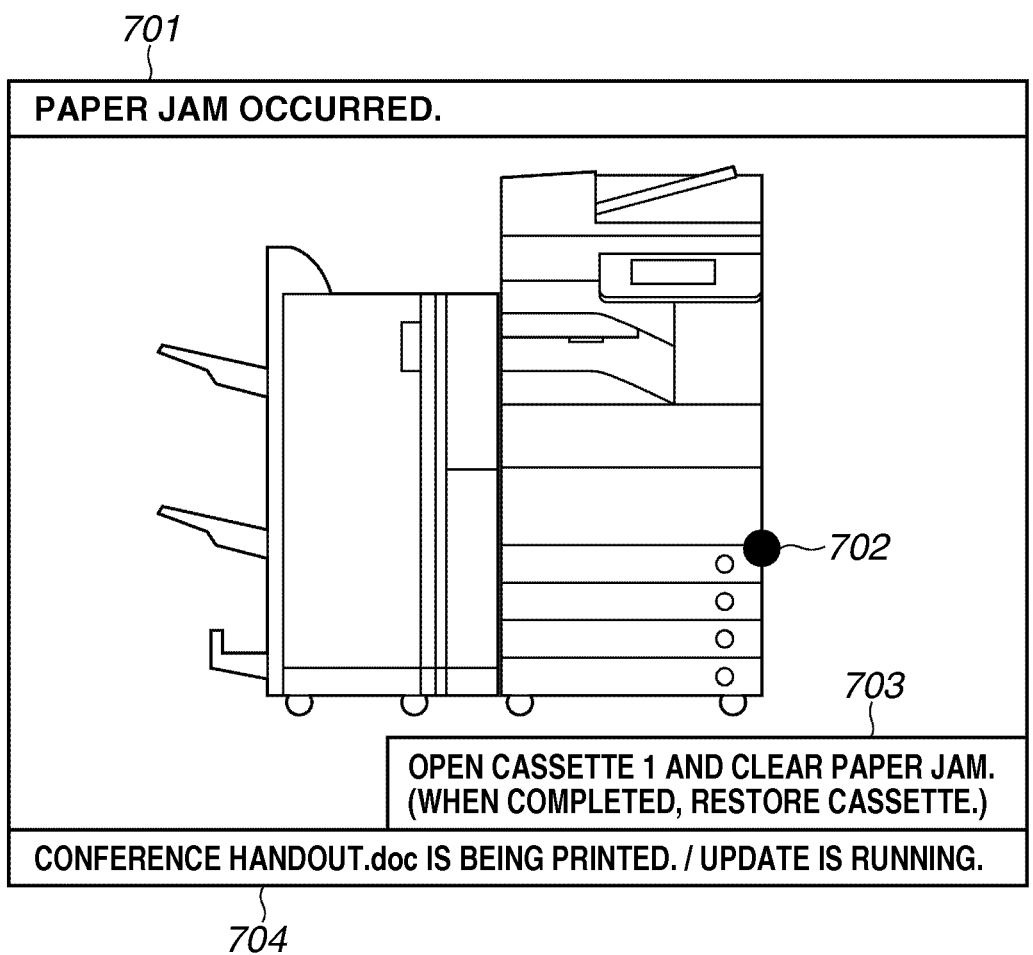
FIG. 7 is a diagram illustrating an example of a screen display by GUI display when a paper jam occurs during job execution and during update of a module not related to GUI display.

FIG. 7 is a diagram illustrating an example of a screen display by GUI display when a paper jam occurs during job execution and during update of a module not related to GUI display.

A display 701 indicates that a paper jam has occurred.

A display 702 illustrates the location where the paper jam has occurred, in a visually easily identifiable manner.

A display 703 displays a message for prompting the user to clear the paper jam.

A display 704 displays a job status and an update status.

Figure 8:
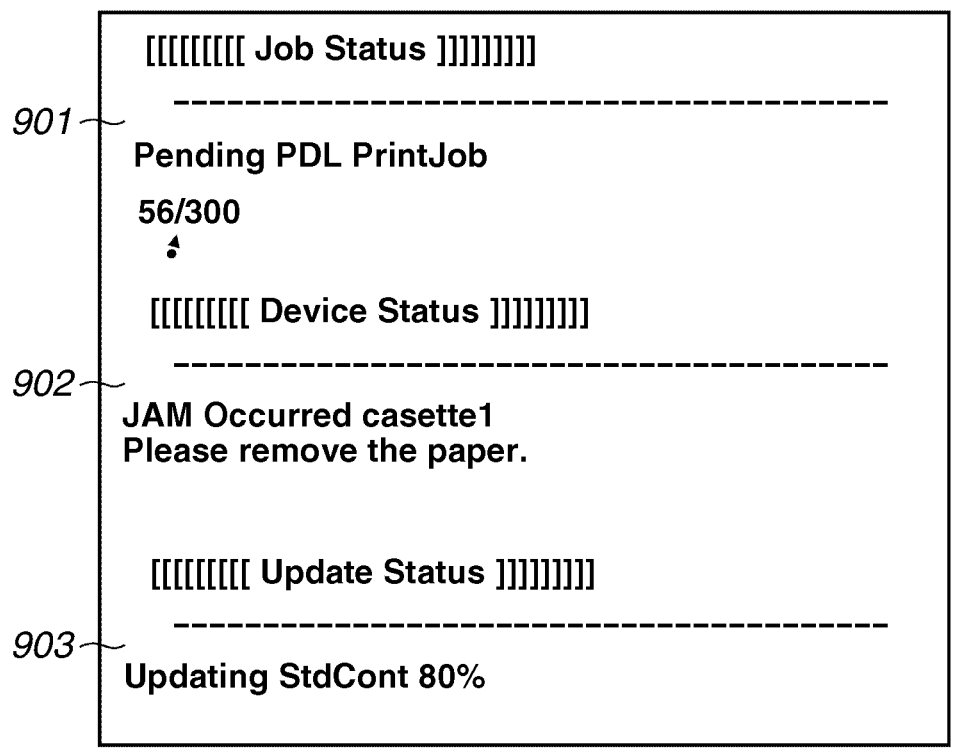
FIG. 8 is a diagram illustrating an example of CUI display when a paper jam occurs during job execution and during update of a module related to GUI display.

FIG. 8 is a diagram illustrating an example of CUI display when a paper jam occurs during job execution and during update of a module related to GUI display.

A display 901 displays a job status, more specifically, displays that a print job is running.

A display 902 indicates that a paper jam has occurred in cassette 1 and displays a message for prompting the user to clear the paper jam. Unlike the display of FIG. 7, the display 902 is not visually easily identifiable, but can display information necessary for the user to solve the phenomenon.

A display 903 displays an update status.

Figure 9:
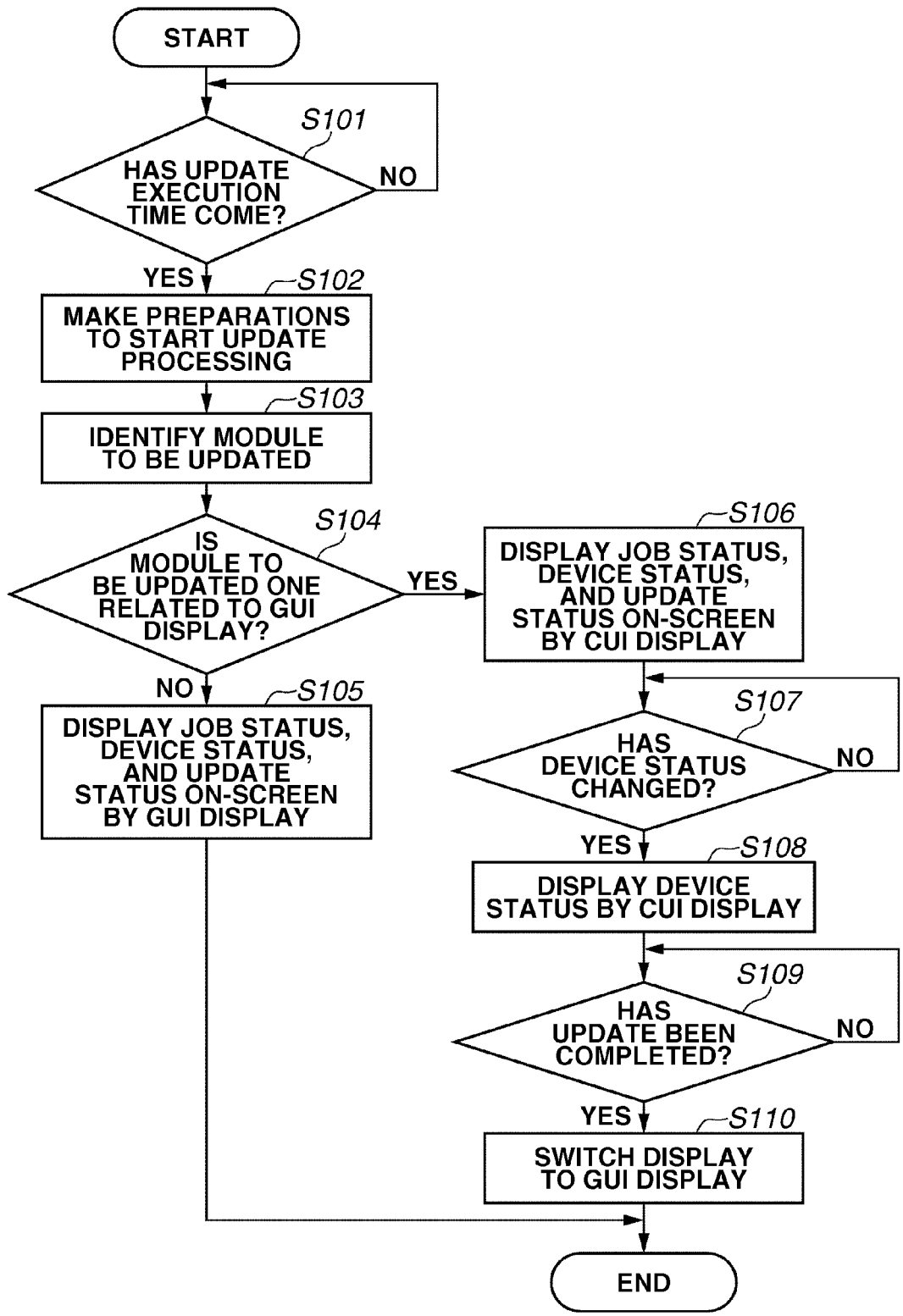
FIG. 9 is a flowchart illustrating an example of processing according to a first exemplary embodiment.

FIG. 9 is a flowchart illustrating an example of processing when a change in a device status such as a paper jam occurs during update.

In step S101, the CPU 210 receives notification from the RTC 270 and determines whether an update execution time has come. If the CPU 210 determines that the update execution time has come (YES in step S101), the CPU 210 proceeds to step S102. In step S101, if the CPU 210 determines that the update execution time has not yet come (NO in step S101), the CPU 210 performs the processing of step S101 again.

In step S102, the CPU 210 makes preparations to start update processing, and proceeds to step S103.

In step S103, the CPU 210 identifies a module to be updated, and proceeds to step S104. The CPU 210 may identify the module to be updated based on update information obtained from the PC 226 or the external server 225, with both of which the CPU 210 can communicate via the network. The CPU 210 may identify a module as the one to be updated if version information about the module, the version information being included in the update information, corresponds to a later version than the current version of the module.

In step S104, the CPU 210 determines whether the module to be updated, identified in step S103, is one related to GUI display. If the module is determined to be one related to GUI display (YES in step S104), the CPU 210 proceeds to step S106. In step S104, if the CPU 210 determines that the module is one not related to GUI display (NO in step S104), the CPU 210 proceeds to step S105. The CPU 210 may store data in which information about functions is associated with information about modules constituting the functions. Based on such data, the CPU 210 may determine whether the module identified in step S103 is one related to GUI display. An example of the data in which information about functions is associated with information about modules constituting the functions will be described below with reference to FIG. 13. The data in which information about functions is associated with information about modules constituting the functions is an example of correspondence information.

In step S105, the CPU 210 displays a job status, a device status, and an update status on-screen by GUI display, and ends the processing. The CPU 210 may display the information about the job, device, and update statuses on the operation unit 219 or on a web browser. The same applies to the subsequent processing.

In step S106, the CPU 210 displays the job status, the device status, and the update status on-screen by CUI display, and proceeds to step S107.

In step S107, the CPU 210 determines whether the device status has changed. If the CPU 210 determines that the device status has changed, i.e., a paper jam or paper out has occurred (YES in step S107), the CPU 210 proceeds step S108. In step S107, if the CPU 210 determines that the device status has not changed (NO in step S107), the CPU 210 performs the processing of step S107 again.

In step S108, the CPU 210 displays the device status by CUI display, and proceeds to step S109. Here, as described with reference to FIG. 6, the job control module 422 detects a change in the job status or the device status, and transmits the detected information to the modules belonging to the CUI process 411.

In step S109, the CPU 210 determines whether the update has been completed. If the CPU 210 determines that the update has been completed (YES in step S109), the CPU 210 proceeds to step S110. In step S109, if the CPU 210 determines that the update has not been completed (NO in step S109), the CPU 210 performs the processing of step S109 again.

In step S110, the CPU 210 switches display to GUI display, and ends the processing.

As described above, even if a paper jam occurs during update of software related to GUI display, the image processing apparatus 100 can notify the user of the statuses by displaying a screen by CUI display.

A second exemplary embodiment deals with a case where a device status has changed before a module related to GUI display is updated.

Figure 10:
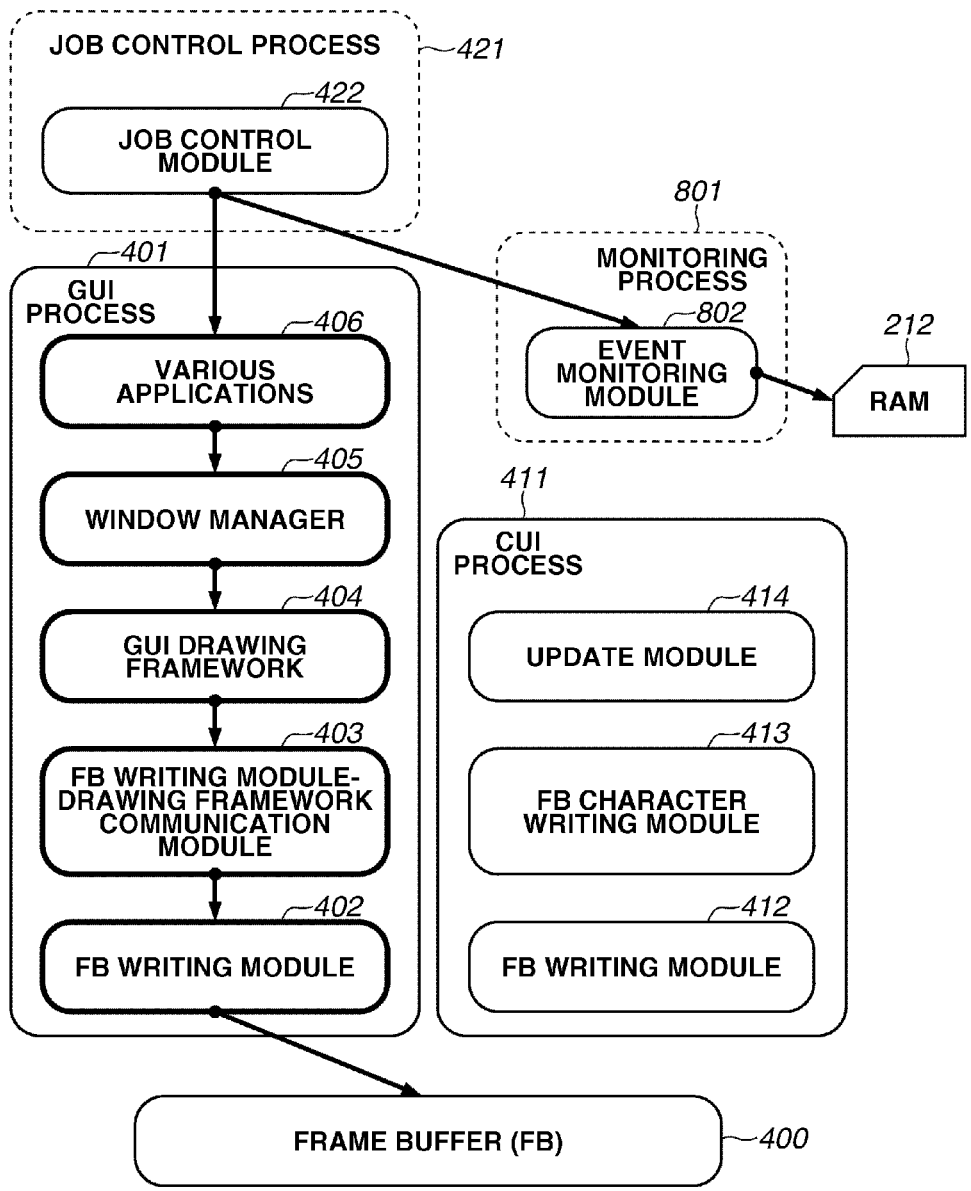
FIG. 10 is a diagram illustrating an example of information transmission paths when a device status has already changed before a module related to GUI display is updated.

FIG. 10 is a diagram illustrating an example of information transmission paths when a device status has already changed (for example, a paper jam has occurred) before a module related to GUI display is updated.

In the state of FIG. 10, the job control module 422 has already detected a change in a job status or a device status and transmitted the detected information to the modules belonging to the GUI process 401 to display a screen by GUI display such as the one illustrated in FIG. 7. When transmitting the information to the modules belonging to the GUI process 401, the job control module 422 also transmits the same information to a module belonging to a monitoring process 801.

The monitoring process 801 includes an event monitoring module 802.

The event monitoring module 802 stores the information notified from the job control module 422 in the RAM 212. When the job control module 422 detects a change in the device status (for example, a clearance of a paper jam), the job control unit module 422 notifies the detected information to the event monitoring module 802 as well as the modules belonging to the GUI process 401. Receiving the information about the change in the device status from the job control module 422, the event monitoring module 802 discards the information stored in the RAM 212.

Figure 11:
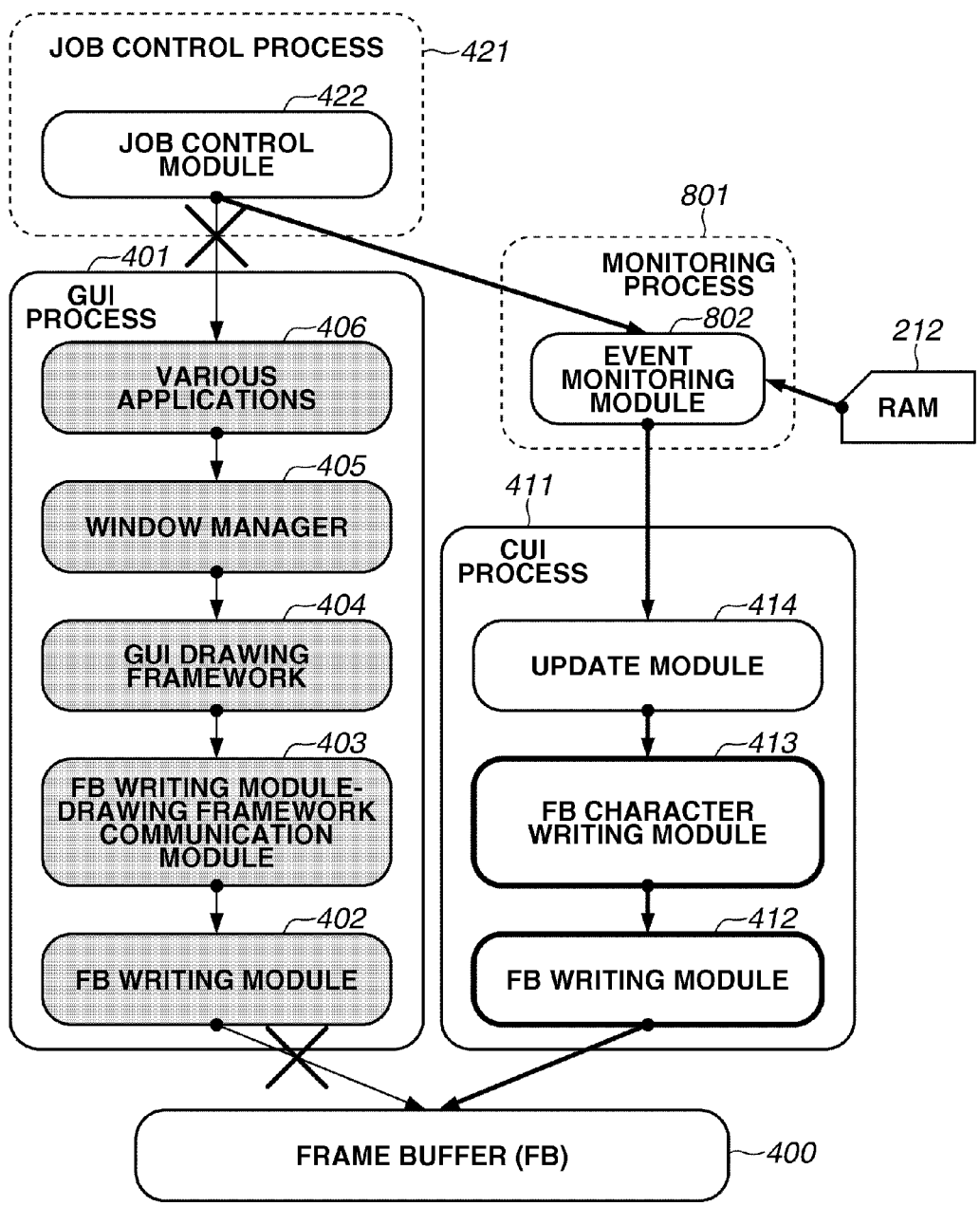
FIG. 11 is a diagram illustrating an example of information transmission paths when a module related to GUI display is updated with the device status changed.

FIG. 11 is a diagram illustrating an example of information transmission paths when a module related to GUI display is updated with the device status changed (for example, with a paper jam occurred).

Since the job control module 422 cannot transmit the detected information to the modules belonging to the GUI process 401, the job control module 422 notifies the detected information to the event monitoring module 802.

The event monitoring module 802 receives the information, and notifies the modules belonging to the CUI process 411 of the information stored so far in the RAM 212 (for example, information about a paper jam), whereby a screen such as the one illustrated in FIG. 8 is displayed by CUI display.

FIG. 12 is a flowchart illustrating an example of processing when the device status has changed before a module related to GUI display is updated.

In step S201, the CPU 210 determines whether the device status has changed. If the CPU 210 determines that the device status has changed, i.e., a paper jam or paper out has occurred (YES in step S201), the CPU 210 proceeds to step S202. In step S201, if the CPU 210 determines that the device status has not changed (NO in step S201), the CPU 210 performs the processing of step S201 again.

In step S202, the CPU 210 makes the job control module 422 notify the modules belonging to the GUI process 401 and the event monitoring module 802 of information about the change in the device status as illustrated in FIG. 10. The CPU 210 proceeds to step S203.

In step S203, the CPU 210 makes the event monitoring module 802 store the notified information in the RAM 212. The CPU 210 proceeds to step S204.

The processing of steps S204 to S209 is similar to that of steps S101 to S105 described above with reference to FIG. 9. A description thereof will be omitted.

In step S210, the CPU 210 makes the job control module 422 notify the event monitoring module 802 of an instruction for CUI display. The CPU 210 proceeds to step S211.

In step S211, the CPU 210 makes the event monitoring module 802 read the information stored in the RAM 212 and transmit the information to the modules belonging to the CUI process 411 to display a screen by CUI display such as the one illustrated in FIG. 8. The CPU 210 proceeds to step S212.

In step S212, the CPU 210 determines whether the update has been completed. If the CPU 210 determines that the update has been completed (YES in step S212), the CPU 210 proceeds to step S213. In step S212, if the CPU 210 determines that the update has not been completed (NO in step S212), the CPU 210 performs the processing of step S212 again.

In step S213, the CPU 210 switches display from CUI display to GUI display, and proceeds to step S214.

In step S214, the CPU 210 determines whether the device status has changed (for example, a paper jam has been cleared and the device status has returned to its original state). If the CPU 210 determines that the device status has changed, i.e., the device status has returned to the original state (YES in step S214), the CPU 210 proceeds to step S215. In step S214, if the CPU 210 determines that the device status has not been changed, i.e., the device status has not returned to the original state (NO in step S214), the CPU 210 performs the processing of step S214 again.

In step S215, the CPU 210 makes the event monitoring module 802 discard the information stored so far in the RAM 212. The CPU 210 ends the processing.

As described above, if a paper jam or paper out occurs during execution of a copy or other job before software related to GUI display is updated, the image processing apparatus 100 stores the information about the statuses so far and displays the information on-screen by CUI display. In such a manner, the image processing apparatus 100 can notify the user of the statuses.

A third exemplary embodiment deals with a case where, when a function is identified from a module to be updated, and a module that can replace the function is also to be updated, the module that can replace the function is updated afterward.

FIG. 13 is a diagram illustrating an example of correspondence between functions and modules.

The information illustrated in FIG. 13 is stored as a database in the HDD 213, for example. A column 1001 indicates functions.

A column 1002 indicates modules.

A row 1003 indicates correspondence between a function related to GUI display and modules. More specifically, the FB writing module 402, the FB writing module-drawing framework communication module 403, the GUI drawing framework 404, and the window manager 405 are assigned to the function for GUI display.

Rows 1004, 1005, and 1006 similarly indicate correspondence between functions and modules. More specifically, the row 1004 indicates correspondence between a function related to CUI display and modules. The row 1005 indicates correspondence between a copy function and modules. The row 1006 indicates correspondence between a print function and modules. A detailed description of the modules in the rows 1004, 1005, and 1006 will be omitted.

FIG. 14A is a diagram illustrating an example of dependency between modules.

The modules listed in dependency A 1011 are the ones related to the GUI process 401. If any one of the modules listed in the dependency A 1011 is being updated, the function of the GUI process 401 will not be implemented. In other words, the image processing apparatus 100 cannot display a screen by GUI display.

The modules listed in dependency B 1012 are the ones related to the CUI process 411. If any one of the modules listed in the dependency B 1012 is being updated, the function of the CUI process 411 will not be implemented. In other words, the image processing apparatus 100 cannot display a screen by CUI display.

FIG. 14B is a diagram illustrating an example of an exclusive relationship between dependency groups illustrated in FIG. 14A.

An exclusive relationship 1013 indicates that the dependency A 1011 and the dependency B 1012 illustrated in FIG. 14A are in an exclusive relationship. More specifically, the exclusive relationship 1013 means that if any one of the modules listed in the dependency A 1011 is to be updated, the image processing apparatus 100 will not update the modules listed in the exclusive dependency B 1012. Similarly, the exclusive relationship 1013 means that if any one of the modules listed in the dependency B 1012 is to be updated, the image processing apparatus 100 will not update the modules listed in the exclusive dependency A 1011.

Figure 15A:
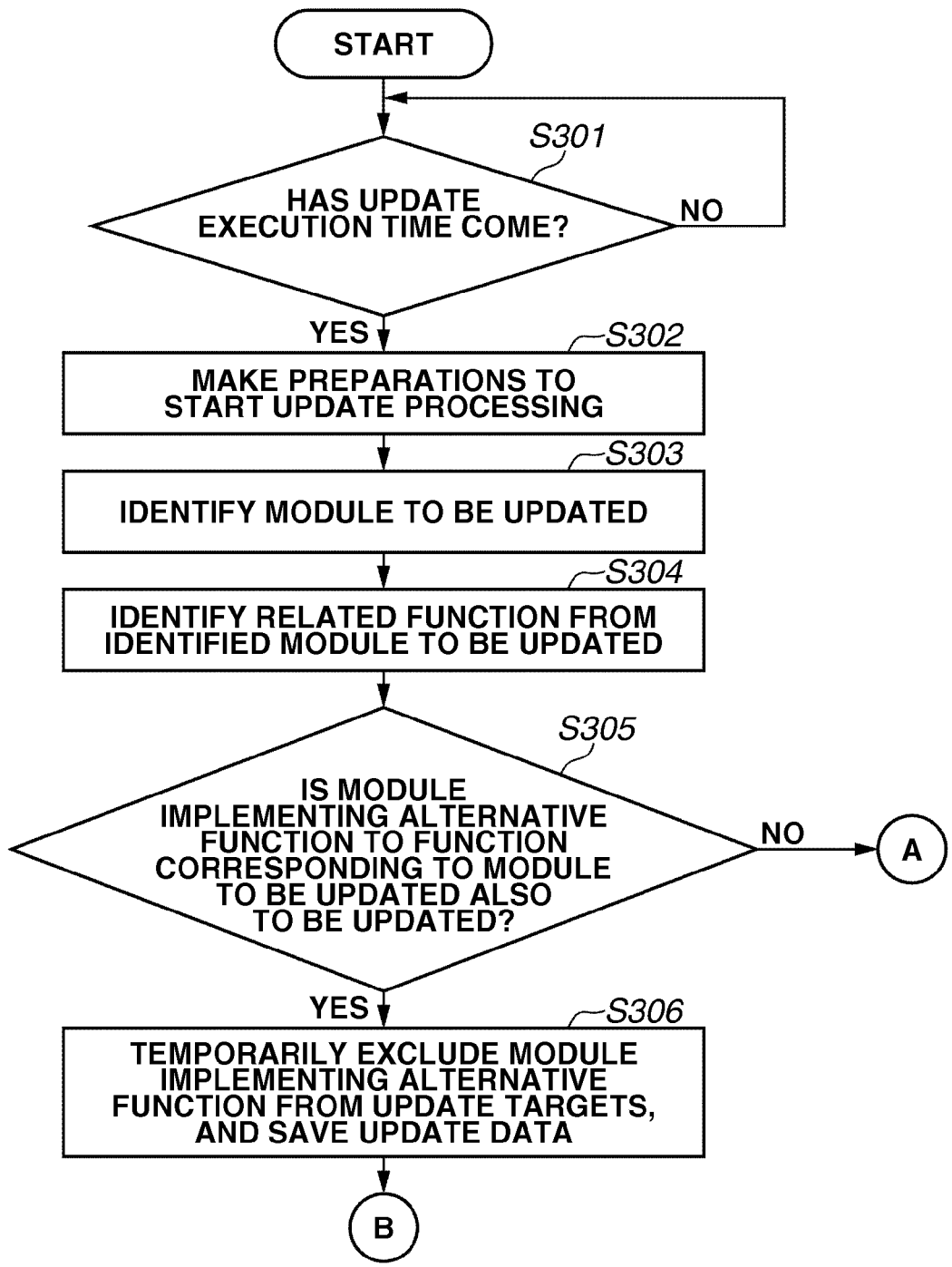
FIG. 15A is a flowchart illustrating an example of processing according to a third exemplary embodiment.

FIG. 15A is a flowchart illustrating an example of processing performed to update, when a function is identified from a module to be updated, and a module that can replace the function is also to be updated, the module that can replace the function afterward.

The processing of steps S301 to S303 is similar to that of steps S101 to S103 described above with reference to FIG. 9. A description thereof will be omitted.

In step S304, the CPU 210 identifies a function related to the identified module to be updated based on data such as the one illustrated in FIG. 13. The CPU 210 proceeds to step S305.

In step S305, the CPU 210 determines whether a module implementing an alternative function to the function corresponding to the module to be updated is to be updated. The alternative function refers to a function with which the function corresponding to the module to be updated have the exclusive relationship described with reference to FIGS. 14A and 14B. In step S305, if the CPU 210 determines that the module implementing the function in the exclusive relationship is to be updated (YES in step S305), the CPU 210 proceeds to step S306. If the CPU 210 determines that the module implementing the function in the exclusive relationship is not to be updated (NO in step S305), the CPU 210 proceeds to connector A. For example, if a module related to GUI display and a module related to CUI display are both to be updated, the CPU 210 determines that a module implementing a function of the exclusive relationship is to be updated.

In step S306, the CPU 210 temporarily excludes the module implementing the alternative function from update targets. The CPU 210 then stores and saves update data into a data area in the various partitions 302 or 303 of the flash ROM 211 illustrated in FIG. 2, or the HDD 213, and proceeds to connector B. For example, if a module related to GUI display is to be updated, the CPU 210 temporarily excludes the modules related to CUI display from update targets.

Next, processing subsequent to A in the flowchart of FIG. 15A will be described.

Figure 15B:
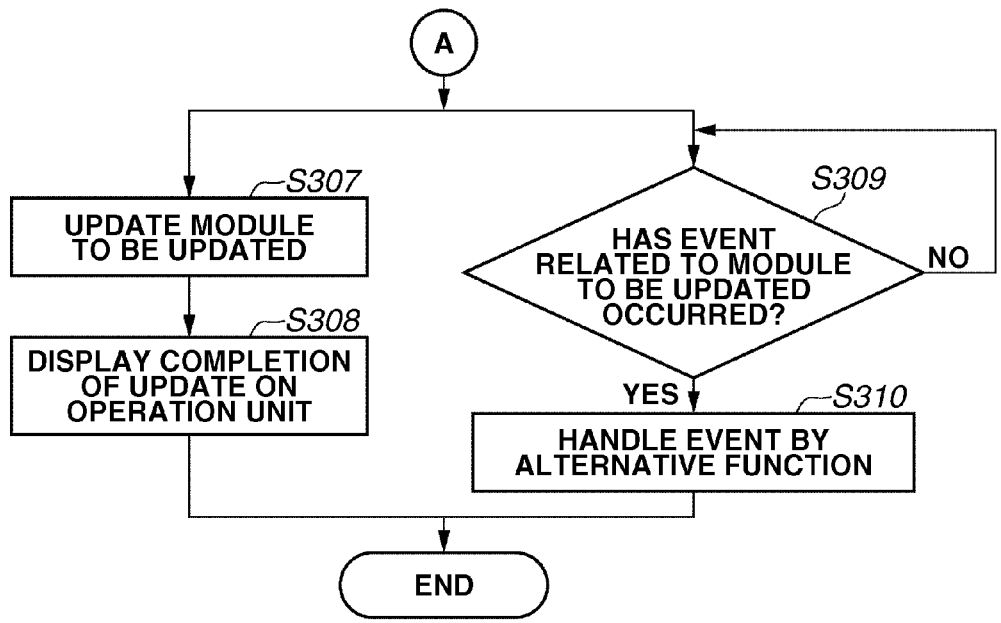
FIG. 15B is a flowchart illustrating an example of processing when no module implementing an alternative function is to be updated in FIG. 15A.

FIG. 15B is a flowchart illustrating an example of the processing subsequent to connector A illustrated in FIG. 15A.

The CPU 210 performs the processing of steps S307 and S308 and that of steps S309 and S310 in parallel.

In step S307, the CPU 210 updates the module identified to be updated in step S303, and proceeds to step S308.

In step S308, the CPU 210 displays the completion of the update on the operation unit 219 by GUI display, thereby notifying the user of the completion of the update. The CPU 210 ends the processing.

In step S309, the CPU 210 determines whether an event related to the module to be updated has occurred. If the CPU 210 determines that an event related to the module to be updated has occurred (YES in step S309), the CPU 210 proceeds to step S310. In step S309, if the CPU 210 determines that no event related to the module to be updated has occurred (NO in step S309), the CPU 210 performs the processing of step S309 again.

In step S310, the CPU 210 handles the event related to the module to be updated, the event determined in step S309, by an alternative function. The CPU 210 then ends the processing. Examples of step S310 include a case where a module related to the GUI process 401 is to be updated although GUI display is required to notify a user of a change in the device status such as those described in the first and second exemplary embodiments. In such a case, in step S310, the CPU 210 displays a screen by CUI display as an alternative function.

Next, processing subsequent to connector B in the flowchart of FIG. 15A will be described.

Figure 15C:
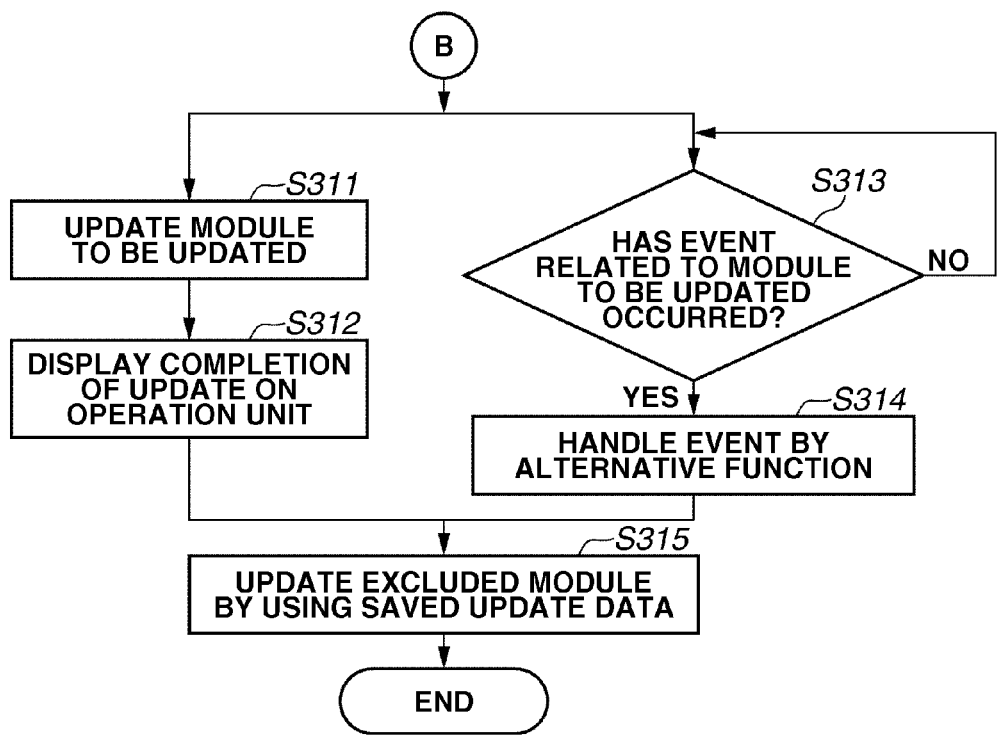
FIG. 15C is a flowchart illustrating an example of processing when a module implementing an alternative function is to be updated in FIG. 15A.

FIG. 15C is a flowchart illustrating an example of the processing subsequent to connector B illustrated in FIG. 15A.

The CPU 210 performs the processing of steps S311 and S312 and that of steps S313 and S314 in parallel.

The processing of steps S311 to S314 is similar to that of steps S307 to S310 of FIG. 15B. A description thereof will be omitted.

In step S315, the CPU 210 updates the module that has been excluded from the update targets, by using the update data saved in step S306. The CPU 210 then ends the processing.

As described above, if pieces of software related to GUI display and CUI display are both to be updated, the image processing apparatus 100 updates either one of the systems afterward. In other words, the image processing apparatus 100 completes updating either one of the systems before updating the other. This can avoid a situation that no display can be presented to the user.

The present exemplary embodiment may be implemented by performing the following processing. The processing includes providing software (program) for implementing the functions of the exemplary embodiments described above to a system or apparatus via a network or various storage media, and reading and executing the program by a computer (or CPU or micro processing unit (MPU)) of the system or apparatus.

As has been described above, according to the foregoing exemplary embodiments, a job status, a device status, and an update status can be displayed to a user even when software related to the GUI display function is updated. Even if a change in a status such as a paper jam occurs, the user can thus easily notice and solve the situation to reduce downtime.

As in the third exemplary embodiment, even if modules related to GUI display and CUI display are both to be updated, the MFP (image processing apparatus 100) can update either one of the systems afterward to avoid a situation where no display can be presented.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-268531 filed Dec. 7, 2012, which is hereby incorporated by reference herein in its entirety.

What is claimed is:

1. A printing apparatus having a first display function and a second display function, the printing apparatus comprising:
   a printing unit configured to execute print processing based on a print job;
   an updating unit configured to execute update processing for updating software of the printing apparatus;
   a display unit configured to display a screen indicating an execution status of the print processing and an execution status of the update processing;
   a determination unit configured to determine, when the updating unit executes the update processing, whether the software to be updated by the update processing is software related to the first display function; and
   a display control unit configured to control, if the determination unit determines that the software to be updated is not software related to the first display function, the display unit to display the screen indicating the execution status of the print processing and the execution status of the update processing by using the first display function, and to control, if the determination unit determines that the software to be updated is software related to the first display function, the display unit to display the screen indicating the execution status of the print processing and the execution status of the update processing by using the second display function.

2. The printing apparatus according to claim 1, wherein the display control unit is configured to switch, if the update processing for updating the software related to the first display function is completed, display of the screen by the display unit from display using the second display function to display using the first display function.

3. The printing apparatus according to claim 1, wherein the display control unit is configured to control, if a paper jam occurs during execution of the print processing, the display unit to display the occurrence of the paper jam on the screen indicating the execution status of the print processing and the execution status of the update processing.

4. The printing apparatus according to claim 1, wherein the display control unit is configured to control, if a paper out occurs during execution of the print processing, the display unit to display the occurrence of the paper out on the screen indicating the execution status of the print processing and the execution status of the update processing.

5. The printing apparatus according to claim 1,
   wherein the first display function is a GUI display function, and
   wherein the second display function is a CUI display function.

6. A method for controlling a printing apparatus having a first display function and a second display function, the method comprising:
   executing print processing by a printing unit based on a printing job;
   executing update processing for updating software of the printing apparatus by an updating unit;
   displaying a screen by a display unit, the screen indicating an execution status of the print processing and an execution status of the update processing;
   when the updating unit executes the update processing, determining by a determination unit whether the software to be updated by the update processing is software related to the first display function; and
   if the determination unit determines that the software to be updated is not software related to the first display function, controlling the display unit by a display control unit to display the screen indicating the execution status of the print processing and the execution status of the update processing by using the first display function, and if the determination unit determines that the software to be updated is software related to the first display function, controlling the display unit by the display control unit to display the screen indicating the execution status of the print processing and the execution status of the update processing by using the second display function.

7. A non-transitory storage medium storing a program that causes a computer to execute the method according to claim 6.

* * * * *